Jan. 5, 1932.  O. L. SHAW  1,839,603
VEHICLE BRAKE DEVICE
Filed Feb. 12, 1929  2 Sheets-Sheet 1
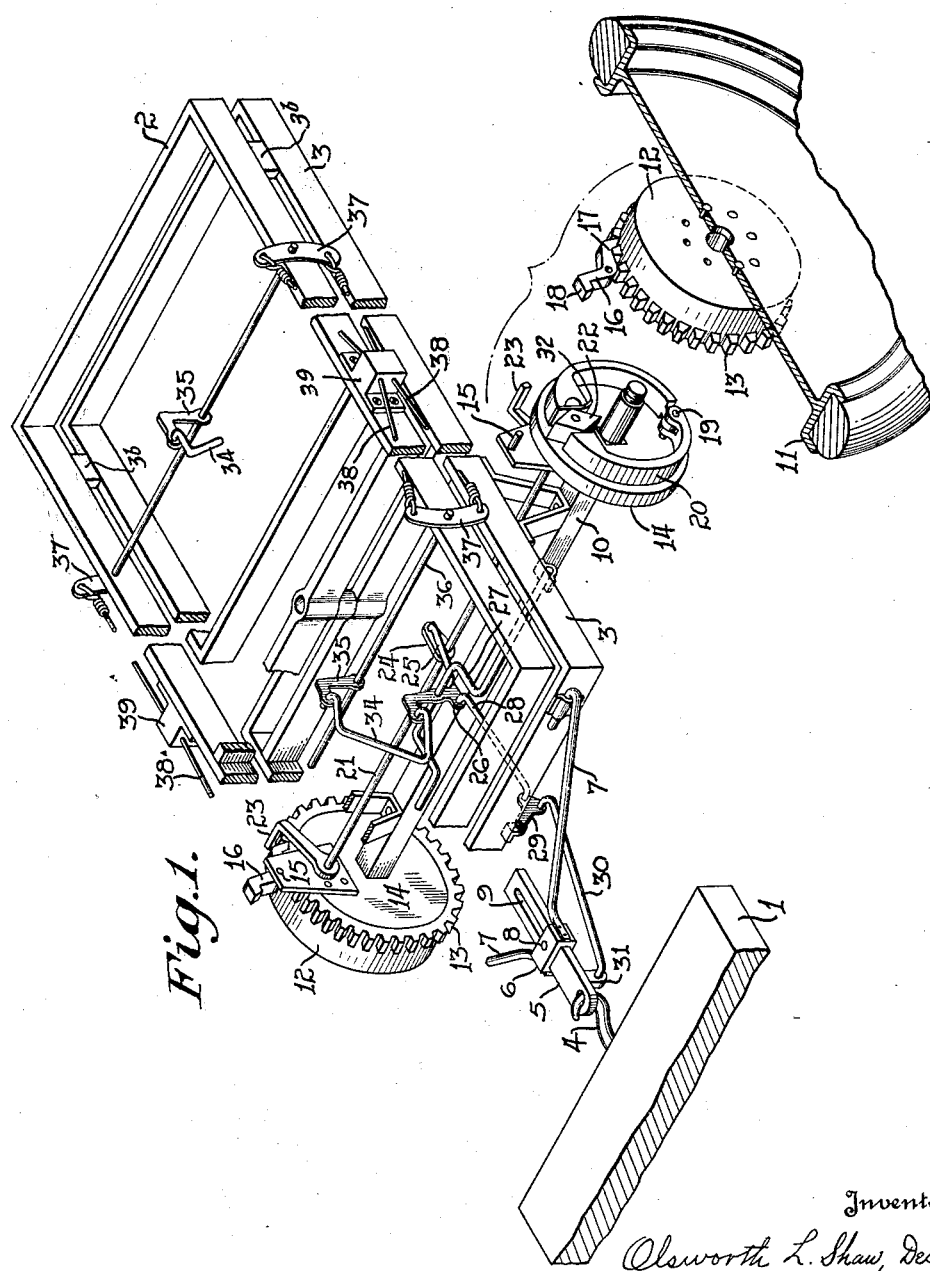
Inventor
Olsworth L. Shaw, Dec'd
Alice Shaw, Adm'x
By Owen & Owen
Attorneys

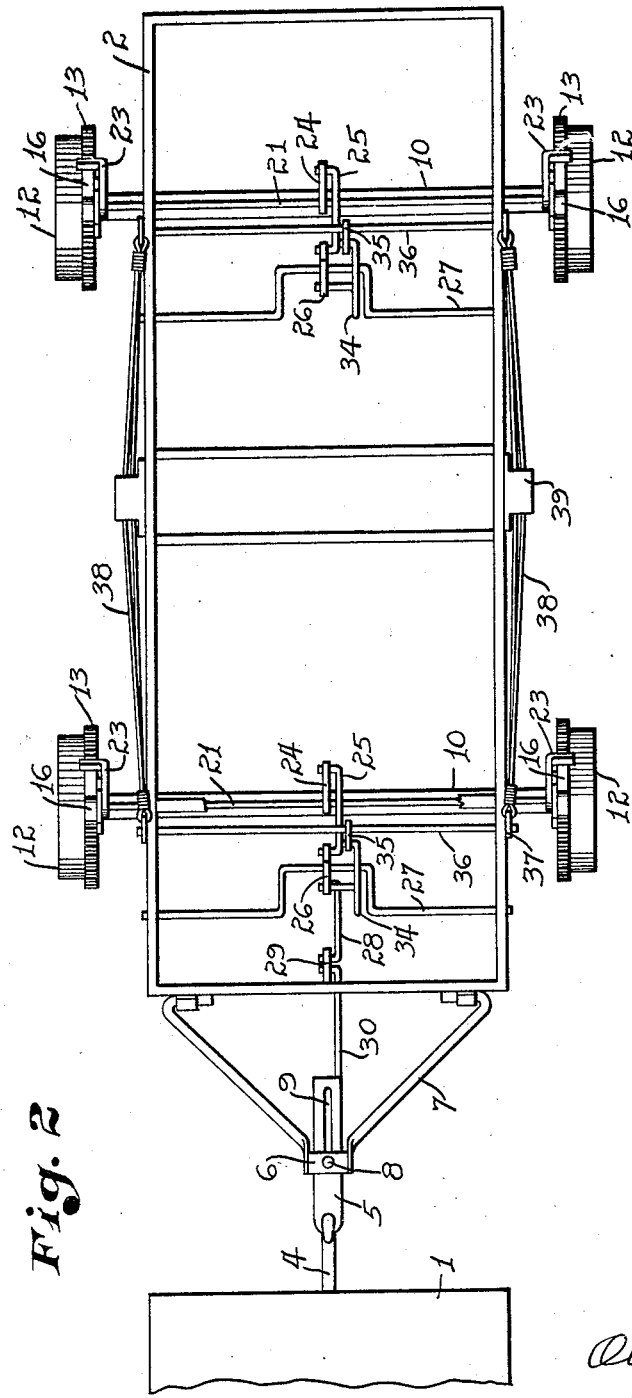

Patented Jan. 5, 1932

1,839,603

UNITED STATES PATENT OFFICE

OLSWORTH LAVELL SHAW, OF OAK HARBOR, OHIO; ALICE SHAW ADMINISTRATRIX OF SAID OLSWORTH LAVELL SHAW, DECEASED

VEHICLE BRAKE DEVICE

Application filed February 12, 1929. Serial No. 339,427.

This invention relates to brake mechanism with special reference to the application thereof to brake drums attached to the wheels of a trailer.

The object of the invention is to provide brake mechanism of the type stated, which is automatically controlled by the forward or backward movement of the vehicle to which the trailer is attached. For this purpose there is a limited lost motion connection between the trailer and a draw bar attached to the vehicle. When starting forward after the vehicle and trailer have been brought to a stop by an application of the brakes, the wheels of the trailer are initially locked against forward movement. As the vehicle moves forward to take up the lost motion, the brakes of the trailer are first set, then the locking means is reversed and the brakes released. When the motion of the vehicle is stopped or retarded by the application of the brakes, the trailer brakes are automatically applied. If the vehicle is then backed, the wheels of the trailer are initially locked against backward movement. As the backing vehicle takes up the lost motion between the draw bar and the trailer, the brakes on the trailer are set until the locking means is again automatically reversed and the brakes are automatically released to permit the trailer to back.

The invention consists also in various details and combinations of elements, the purpose of which will be hereinafter more fully explained.

In the preferred form of the invention, brakes are applied to all four wheels of the trailer.

The invention will be specifically explained in connection with the accompanying drawings, in which Fig. 1 represents a perspective view of the invention as applied to a trailer which is connected to an automobile or other vehicle, several parts of the device being detached in order to better illustrate the construction; Fig. 2 is a plan view of the invention; Fig. 3 is a sectional detail view illustrating the link connections for operating the front brakes; and Fig. 4 is a similar view illustrating the link connections for operating the rear brakes.

As illustrated in the drawings, the invention is associated with a vehicle 1 to which is connected a trailer 2 supported by trucks 3 through suitable bolsters $3^a$ and $3^b$. Secured to the rear end of the vehicle 1 is a hook or bracket 4 to which a draw bar 5 is connected. A collar 6 is pivotally connected to the front end of the front truck 3 by means of divergent links 7 and this collar has a lost motion connection with the draw bar 5 which is limited by a pin 8 which passes through a slot 9 in the draw bar.

Each truck has an axle 10 on the ends of which supporting wheels 11 are journaled. Each wheel 11 has a brake drum 12 secured thereto and provided at one edge with teeth 13. Adjacent to this drum a support 14 is secured to the axle.

To the upper part of this support a pivot pin 15 is secured and on this pivot pin is mounted a double reversible dog 16 having oppositely disposed arms 17 and 18 which are respectively engageable with the teeth 13 to lock the wheel against forward or rearward movement as the case may be. To the lower part of the support 14 there is secured a pivot pin 19 on which brake shoes 20 are pivotally mounted.

A brake shaft 21 is arranged parallel to the axle 10 and is journaled at each end in one of the supports 14. To each end of the brake shaft 21 there is secured and elongated expansion lug 22, which is engageable with proximate ends of the brake shoes 20 to force the latter into engagement with the brake drum as the shaft 21 is rocked in either direction from its normal position. A displacement arm 23 is secured near each end of the brake shaft 21 and is adapted to engage the dog 16 and reverse the same upon a predetermined rocking movement of the shaft 21.

The movement of the shaft 21 is controlled through the medium of a lever arm 24 secured near the center thereof. The outer end of this arm is connected by a link 25 to a hanger 26 secured to a crank shaft 27 which is journaled in the sides of the truck 3. The hanger 26 is also connected by a link 28 to a hanger 29 depending from the front part of the truck. This hanger 29 is in turn connected by a link 30 to the arm 31 secured to the draw bar 5. Thus forward or rearward movement of the draw bar with relation to the trailer effects a rocking movement of the brake shaft 21.

Each expansion lug 22 as it rocks is adapted to engage a spring 32 which extends across one of the proximate ends of the brake shoes 20. Behind the spring 32, the end of the brake shoe is concave so as to allow the spring to yield as the brake shaft with the lugs 22 is rocked. The brake shoes are forced into engagement with the brake drums, but the springs 32 are adapted to yield sufficiently to permit the lugs to pass the point where the brakes are set and upon continued movement to release the brakes.

In the operation of the invention, after the vehicle and trailer have been stopped by the application of the brakes, the parts will be in the position illustrated in Figs. 1 and 3. When the motive vehicle starts forward it takes up the lost motion between the draw bar 5 and the collar 6, moving the links 30, 28 and 25 forwardly with relation to the trailer, the trailer wheels being at this time locked against forward movement by the reversible dogs 16. The forward movement of the link 25 moves the arm 24 forwardly, rocking the shaft 21 with the expansion lugs 22. This spreads the brake shoes 20 to set the brakes, after which the displacement arms 23 engage the dogs 16 and shift them to reverse position whereby the wheels are locked against rearward movement, but are released for forward movement. Continued forward movement of the link 25 until the pin 8 engages the rear end of the slot 9 causes a continued rotation of the lugs 22, the springs 32 permitting such movement, until the brakes are released and the trailer is permitted to move forward with the motive vehicle.

In stopping and backing, there is a reverse motion of the draw bar 5 in relation to the collar 6 and the trailer which moves the various parts of the brake mechanism back to the positions shown in the drawings. During this movement the wheels of the trailer are initially locked by the dogs 16 against rearward movement. The brakes are then set, the dogs reversed to lock the wheels against forward movement and the brakes are then released as the draw bar reaches rearmost positions with respect to the collar 6, so that the trailer can be backed if desired.

In order that brakes may be applied simultaneously to all four wheels of the trailer, the hanger 26 is connected by a bar 34 to an arm 35 projecting laterally from a countershaft 36 which is journalled in the trailer body 2 and has a cross head 37 at each end. The brake mechanism associated with the rear wheels is similar in all respects to that provided for the front wheels. Each cross head 37 on the front countershaft 36 is connected by cables 38 to a correspoding cross head 37 on the rear countershaft 36. These cables 38 may be guided in keepers 39 attached to the sides of the trailer body. By this means the brake mechanism for the rear wheels operates in unison with the brake mechanism for the front wheels.

While the preferred form of the invention is described in detail, it is apparent that the same may be considerably modified without departing from the scope of the appended claims.

What is claimed is:

1. The combination with a vehicle, of a wheel supported trailer having a lost motion connection therewith, brake drums secured to certain of the trailer wheels, brakes associated with said drums, means for initially locking said wheels against movement in the direction in which the vehicle starts to move to take up the lost motion, means for successively applying the brakes to the drums, releasing said locking means, and then releasing said brakes, as the vehicle takes up the lost motion.

2. The combination with a vehicle, of a wheel supported trailer having lost motion connection therewith, means operable by movement of the vehicle to lock the trailer wheels against forward movement when the trailer is in its rearmost relative position and to lock them against rearward movement when the vehicle is in its foremost relative position, friction brakes associated with certain of the trailer wheels, and means also operable by the movement of the vehicle to apply the brakes to the trailer wheels while the vehicle is in an intermediate relative position, and to release said brakes whenever the vehicle reaches an extreme relative position.

3. The combination with an axle having a ground wheel mounted at each end thereof, a brake drum on each wheel, and brake shoes supported adjacent the drums, of a shaft mounted parallel to the axle, means for rocking the shaft, lugs secured to the shaft and engageable with the brake shoes to force the latter against the drums when the shaft is rocked, and means including springs for releasing the brake shoes when the shaft is rocked further in the same direction to move the lugs past shoe-engaging position.

4. The combination of a brake drum, brake shoes pivotally supported adjacent the drum, an elongated lug between proximate ends of the brake shoes, a contact element covering one of said ends, and means for rocking said lug to engage said contact element and the other proximate end and spread the brake shoes to engage the drum, said contact element being sufficiently yieldable to permit the lug to be turned in the same direction past braking position to release the brakes.

OLSWORTH LAVELL SHAW.